United States Patent
Lee (10) Patent No.: US 7,430,675 B2
(45) Date of Patent: Sep. 30, 2008

(54) ANTICIPATORY POWER MANAGEMENT FOR BATTERY-POWERED ELECTRONIC DEVICE

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/675,979

(22) Filed: Feb. 16, 2007

(65) Prior Publication Data

US 2008/0201587 A1 Aug. 21, 2008

(51) Int. Cl.
  *G06F 1/00* (2006.01)
  *G06F 1/26* (2006.01)
  *G06F 1/32* (2006.01)

(52) U.S. Cl. .............. 713/320; 713/300; 713/340; 482/8

(58) Field of Classification Search ........ 713/320, 713/300, 340; 482/8
See application file for complete search history.

(56) References Cited

U.S. PATENT DOCUMENTS

| | | | | |
|---|---|---|---|---|
| 5,311,441 A | * | 5/1994 | Tayama et al. ........ | 702/63 |
| 5,365,453 A | * | 11/1994 | Startup et al. ........ | 702/63 |
| 5,781,783 A | * | 7/1998 | Gunther et al. ........ | 713/320 |
| 6,189,106 B1 | * | 2/2001 | Anderson ........ | 713/300 |
| 6,943,693 B2 | * | 9/2005 | Kim ........ | 340/636.1 |
| 7,240,223 B2 | * | 7/2007 | de Cesare et al. ........ | 713/300 |
| 2002/0138772 A1 | * | 9/2002 | Crawford et al. ........ | 713/300 |
| 2005/0240786 A1 | * | 10/2005 | Ranganathan ........ | 713/320 |
| 2006/0143483 A1 | * | 6/2006 | Liebenow ........ | 713/300 |
| 2006/0149908 A1 | * | 7/2006 | Chen et al. ........ | 711/156 |
| 2007/0204174 A1 | | 8/2007 | Dorogusker et al. | |
| 2007/0270721 A1 | | 11/2007 | Ananny | |
| 2007/0271065 A1 | | 11/2007 | Gupta et al. | |
| 2007/0271116 A1 | | 11/2007 | Wysocki et al. | |
| 2007/0273714 A1 | | 11/2007 | Hodges et al. | |

OTHER PUBLICATIONS

U.S. Appl. No. 11/566,072, filed Dec. 1, 2006, entitled "System including Portable Media Player and Physiologic Data Gathering Device".
U.S. Appl. No. 11/439,523, filed May 22, 2006, entitled "Portable Media Device with Workout Support".
U.S. Appl. No. 11/209,367, filed Aug. 22, 2005, entitled "Audio Status Information for a Portable Electronic Device".
U.S. Appl. No. 11/565,890, filed Dec. 1, 2006, entitled "Power Consumption Management for Functional Preservation in a Battery-Powered Electronic Device".
U.S. Appl. No. 11/439,613, filed May 23, 2006, entitled "Portable Media Device with Power Managed Display".
"Sprint and Bones in Motion Launch Mobile Fitness Application", Press Release, Feb. 7, 2006, 2 pgs.

* cited by examiner

*Primary Examiner*—Thomas Lee
*Assistant Examiner*—Ji H Bae (57) ABSTRACT

Methods and apparatus for managing power consumption of a battery-powered electronic device are disclosed. According to one embodiment, power management can take action to reduce power consumption to accommodate estimated power requirements. According to another embodiment, power management can notify a user when a power deficiency is anticipated. According to still another embodiment, power management can advise a user to charge a battery of the battery-powered electronic device. According to still another embodiment, a user can influence power management by user selections.

34 Claims, 8 Drawing Sheets

POWER REDUCTION PREFERENCES

USAGE: 702

> RUN

706 ☐ Can turn off backlight

708 ☐ Can limit media playback volume

710 ☐ Can disable phone

> PHONE CALL 704  714 ☐ Can disable local wireless network

716 ☐ Can disable all non-call functions

718 ☐ Warn me when remaining call time is ☐▽ minutes
720

712
☐ Remind me to charge

ANTICIPATORY POWER MANAGEMENT FOR BATTERY-POWERED ELECTRONIC DEVICE

BACKGROUND OF THE INVENTION

1. Field of the Invention

The present invention relates to battery-powered electronic devices and, more particularly, to managing battery consumption on a portable electronic device.

2. Description of the Related Art

Conventionally, portable electronic devices, such as cellular phones, portable digital assistants or portable media players, have provided visual clues regarding certain device status conditions. For example, battery-powered portable electronic devices frequently display a visual indication of battery status. The visual indication typically indicates the extent to which the battery is charged (i.e., battery level). Additionally, cellular phones often not only provide such a visual indication of battery level but also provide an auditory, periodic beeping sound while a call is in process to alert the user when the battery level is particularly low.

Unfortunately, however, these conventional indications of battery level are often ignored by users. Moreover, as portable electronic devices become more advanced, battery charge can be rapidly consumed without users being aware. Another difficulty is that users sometimes fail to adequately charge batteries which can seriously hinder the ability of the batteries to power respective portable electronic devices as desired. Thus, there is a need for improved techniques to inform and assist users in managing available battery power on portable media players.

SUMMARY OF THE INVENTION

The invention pertains to power management of a battery-powered electronic device. According to one embodiment, power management can take action to reduce power consumption to accommodate estimated power requirements. According to another embodiment, power management can notify a user when a power deficiency is anticipated. According to still another embodiment, power management can advise a user to charge a battery of the battery-powered electronic device. According to still another embodiment, a user can influence power management by user selections.

The invention can be implemented in numerous ways, including as a method, system, device, apparatus (including graphical user interface), or computer readable medium. Several embodiments of the invention are discussed below.

As a method for managing power utilization by an electronic device powered by a battery, one embodiment of the invention can include, for example: estimating a future power requirement for the electronic device; obtaining a battery characteristic associated with the battery; determining, based on the battery characteristic, whether the battery has adequate capacity to satisfy the estimated future power requirement for the electronic device; and reducing power consumption of the electronic device when it is determined that the battery has inadequate capacity to satisfy the future power requirement.

As a method for managing power utilization by an electronic device powered by a battery, another embodiment of the invention can include, for example: identifying an impending device usage; obtaining a power estimate for the electronic device to complete the impending device usage; obtaining a battery characteristic associated with the battery; determining, based on the battery characteristic, whether the battery has adequate capacity to satisfy the power estimate for the electronic device to complete the impending device usage; and reducing power consumption of the electronic device during at least the impending device usage when it is determined that the battery has inadequate charge capacity to satisfy the power estimate for the electronic device to complete the impending device usage.

As a method for managing power utilization by an electronic device powered by a battery, still another embodiment of the invention can include, for example: estimating a future power requirement for the electronic device; obtaining a battery characteristic associated with the battery; determining, based on the battery characteristic, whether the battery has adequate capacity to satisfy the estimated future power requirement for the electronic device; and presenting a notification regarding charging the battery when the determining determines that the battery has inadequate capacity to satisfy the future power requirement.

As a computer readable medium including at least computer program code for managing power utilization by an electronic device powered by a battery, one embodiment of the invention can include, for example: computer program code for estimating a future power requirement for the electronic device; computer program code for determining whether the battery has adequate capacity to satisfy the estimated future power requirement for the electronic device; and computer program code for reducing power consumption of the electronic device when the determining determines that the battery has inadequate capacity to satisfy the future power requirement.

As a portable electronic device, one embodiment of the invention can include, for example: a display, a battery, a battery monitor configured to acquire battery status information from the battery, a device usage manager configured to provide device usage information, and a power manager operatively connected to the battery monitor and the device usage manager. The power manager manages power utilization by the electronic device based on the device usage information and the battery status information.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to power management of a battery-powered electronic device. According to one embodiment, power management can take action to reduce power consumption to accommodate estimated power requirements. According to another embodiment, power management can notify a user when a power deficiency is anticipated. According to still another embodiment, power management can advise a user to charge a battery of the battery-powered electronic device. According to still another embodiment, a user can influence power management by user selections.

The invention is well suited for a portable electronic device that can support multiple functions. In one embodiment, the invention is suitable for use with a portable electronic device having at least wireless voice communication capability and media playback capability. The portable electronic device can, for example, be a portable media device (e.g., digital music player or MP3 player) having wireless voice communications. In another embodiment, the portable electronic device can be a wireless communications device (e.g., cellular phone) having media playback capabilities. In still another embodiment, the portable electronic device can be a portable electronic device having media playback capability and workout support via a workout manager. These portable electronic devices can also have other functions (e.g., applications), such as functions supporting electronic calendars, electronic appointments, network browsers, network data transfers, VoIP applications, etc.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
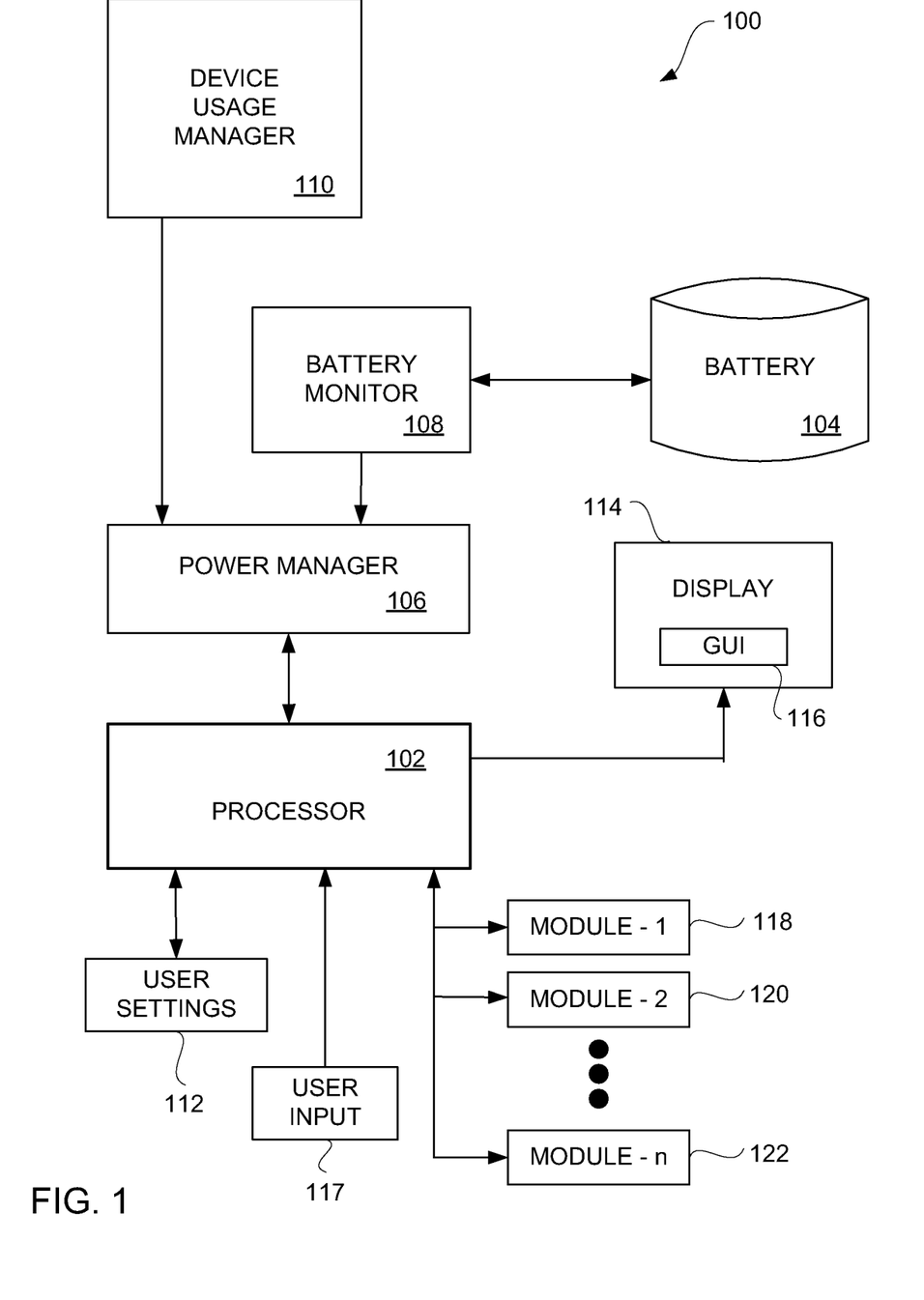
FIG. 1 is a block diagram of an electronic device according to one embodiment of the invention.

FIG. 1 is a block diagram of electronic device 100 according to one embodiment of the invention. Device 100 is typically a portable or mobile electronic device. Device 100 can pertain to a computing device, a media player, a mobile telephone, a portable game player, portable workout manager, and the like. In one embodiment, device 100 is a multi-function device that supports a plurality of different functions. As one example, device 100 can be portable and operate as a mobile telephone while also operating as a media player. As another example, the device 100 can operate as a media player while also operating as a portable workout manager.

Device 100 can include processor 102 that controls the overall operation of device 100. In addition, device 100 can include battery 104 that provides power to device 100. Typically, battery 104 is rechargeable by coupling battery 104 to an AC outlet to allow a charge circuit (not shown) to charge battery 104.

Device 100 can include power manager 106. Power manager 106 can manage power consumption by device 100. In one embodiment, the power consumption of device 100 is managed by power manager 106 based on usage of device 100 by a user. Power manager 106 can be coupled to processor 102 so that power manager 106 can inform processor 102 of any power related information or actions to be performed. Although power manager 106 is shown in FIG. 1 as separate form processor 102, it should be understood that power manager 106 could also be part of or incorporated into processor 102. Device 100 can also include battery monitor 108 that couples to battery 104 so as to monitor the condition of battery 104. Battery monitor 108 can provide the battery condition, namely, one or more battery characteristics, to power manager 106. For example, the battery characteristics can pertains to one or more of charge level, temperature, voltage, current, etc.

Electronic device 100 can also include device usage manager 110. Device usage manager 110 operates to monitor present, imminent, current or future use of device 100. Device usage manager 110 can provide device usage information to power manager 106. Hence, power manager 106, alone or in combination with processor 102, can evaluate whether the condition of battery 104 is adequate to satisfy the device usage requirements that have been identified by device usage manager 110.

Device 100 can also store one or more user settings 112. At least one of user settings 112 can pertain to a user setting regarding operation of device 100 when the charge capacity of battery 104 is diminished as compared to the power estimated to be required to satisfy the device usage requirements. As an example, user settings 112 can signal processor 102 that the user has certain preferences on how device 100 should operate when available battery charge is inadequate. Processor 102 can also couple to one or more modules, which can be hardware and/or software components (including software applications), within device 100. For example, the modules can include first module module-1 118, second module-2 120 and nth-module module-n 122. The different modules can pertain to different functions or capabilities that can be supported by device 100. As an example, first module 118 can pertain to a media player and second module 120 can pertain to a mobile telephone capability. Another of the modules can pertain to a workout manager. A workout manager can operate to record workout data, such as performance data, and also provide for playback of media (sometimes particular media) during a workout by a user of the device 100. The workout typically involves exercise (walk, run, cycle, swim, etc.). Additional details on workout management by portable electronic devices are provided in: (i) U.S. patent application Ser. No. 11/566,072, filed Dec. 1, 2006, and entitled "SYSTEM INCLUDING PORTABLE MEDIA PLAYER AND PHYSIOLOGIC DATA GATHERING DEVICE," which is hereby incorporated herein by reference; and (ii) U.S. patent application Ser. No. 11/439,523, filed May 22, 2006, and entitled "PORTABLE MEDIA DEVICE WITH WORKOUT SUPPORT," which is hereby incorporated herein by reference.

Still further, device 100 can include display 114. As appropriate, graphical user interface (GUI) 116 can present on display 114 a dialog window in which a user can influence how device 100 reduces power. User input device 117 can assist a user in providing user input, such as by interacting with GUI 116. User input device 117 can pertain to one or more input buttons, touch-sensitive surfaces, etc. that enable the user to provide user input, such as user selections for usage or for power management.

Typically, it will be useful to operate device 100 in a reduced power manner when the available battery charge is inadequate to support the device usage requirements. In one embodiment, when the battery charge capacity is inadequate to support the device usage requirements, to reduce power consumption, one or more of modules 118-122 can be deactivated. The extent and or order by which modules 118-122 are deactivated can also be influenced by user settings 112 and/or user selections made with respect to GUI 116. In another embodiment, when the battery charge capacity is inadequate to support the device usage requirements, a notification can be presented by device 100. For example, a notification can be displayed on display 114 via GUI 116. The notification can inform the user of the insufficient battery charge capacity and/or provide recommendations regarding charging battery 104.

Although device 100 is powered by battery 114, in one embodiment, device 100 can also at times utilize power from AC power supplied via a power cord coupled to an AC plug. The AC power is also used to charge battery 114.

Figure 2:
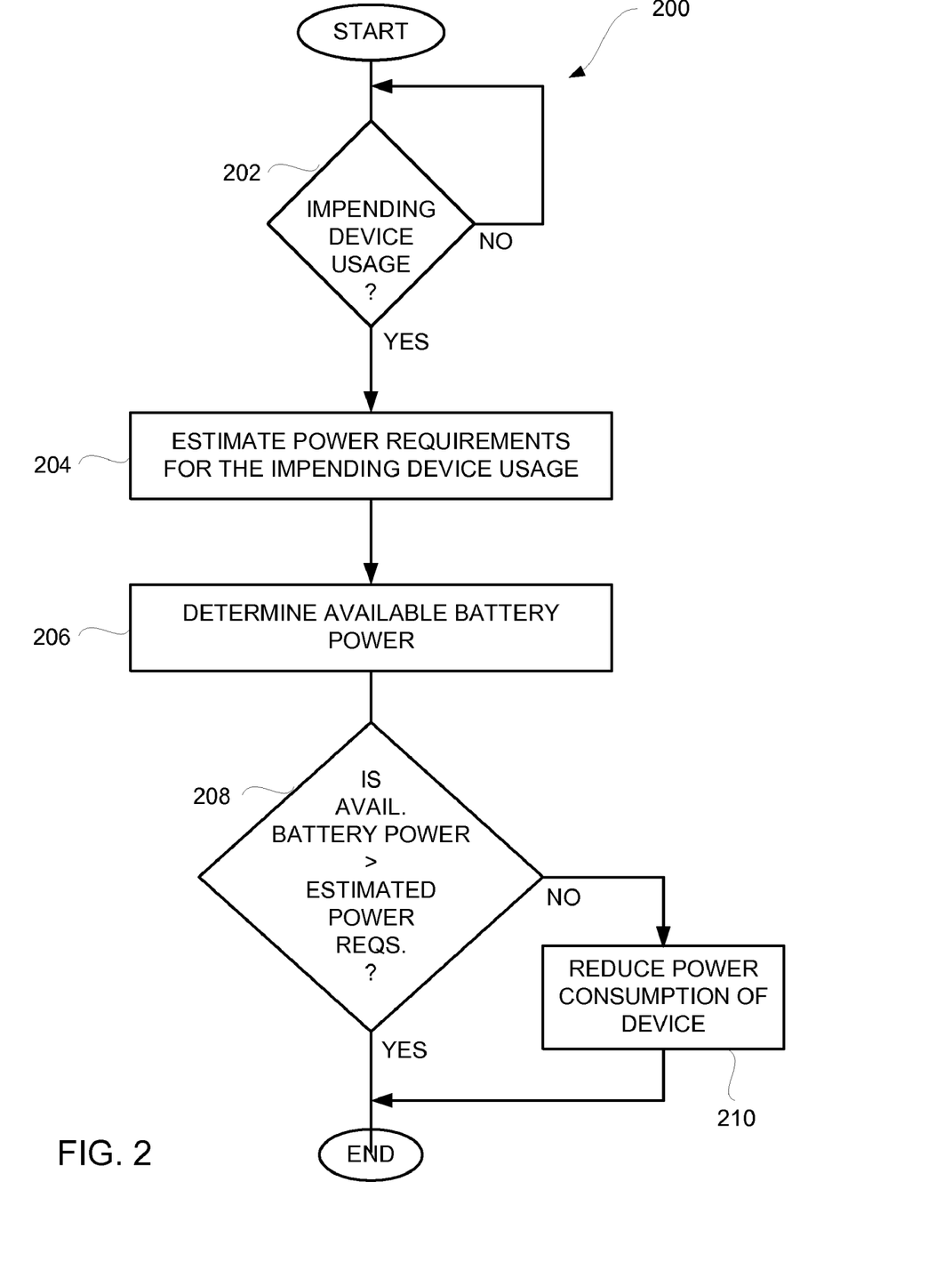
FIG. 2 is a flow diagram of a power manager process according to one embodiment of the invention.

FIG. 2 is a flow diagram of power manager process 200 according to one embodiment of the invention. Power manager process 200 is, for example, performed by an electronic device, such as electronic device 100 illustrated in FIG. 1. As an example, power manager 106, alone or in combination with processor 102, can perform power manager process 200.

Power manager process 200 can begin with decision 202. Decision 202 determines whether device usage is impending. When device usage, that is usage of the electronic device, is not impending, power manager process 200 can wait until device usage is impending. Impending device usage can be usage that is current, usage that is imminent, usage that is predicted to occur relatively soon, or usage that is previously scheduled, (e.g., via a calendar or schedule). Impending device usage can also be referred to as anticipated device usage. In any case, if decision 202 determines that device usage is impending, power requirements for the impending device usage can be estimated 204. The power requirements can be estimated 204 based on a type of usage and/or historical data regarding usage.

Available battery power can also be determined 206. As an example, a battery monitor, such as battery monitor 108, can determine one or more battery characteristics (e.g., battery charge level) from which the available battery power can be determined. The available battery power can be determined 206 from the one or more battery characteristics.

Decision 208 can then determines whether the available battery power is greater than the estimated power requirements. When decision 208 determines that the available battery power is not greater than the estimated power requirements, then there is a shortage of available battery power in order to satisfy the impending device usage power requirements. Accordingly, power manager process 200 can reduce 210 power consumption of the device. The power consumption of the device can be reduced 210 in a variety of different ways. As one example, certain non-essential functions of the electronic device could be disabled to reduce power consumption. As another example, certain functions, operations or components of the electronic device can be used in a more power efficient manner. Regardless of how the power consumption of the device is reduced 210, the reduction of power consumption can operate to enable the available battery power to be better utilized to support the impending device usage power requirements. Following block 210, power manager process 200 can end. Also, when decision 208 determines that the available battery power is greater than the estimated power requirements for the impending device usage, power manager process 200 can also end since the available battery power is adequate.

Figure 3:
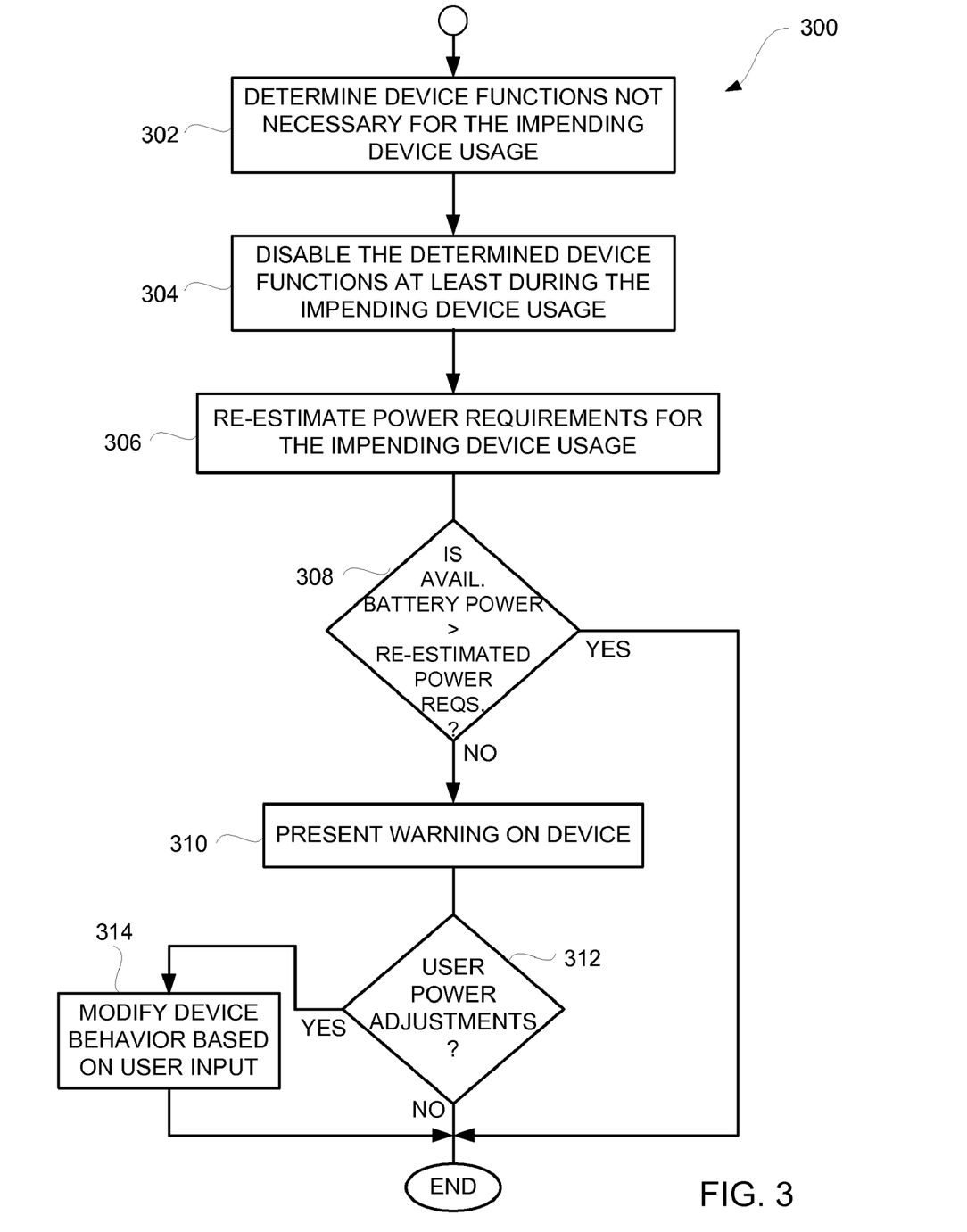
FIG. 3 is a flow diagram of a power reduction process according to one embodiment of the invention.

FIG. 3 is a flow diagram of power reduction process 300 according to one embodiment of the invention. Power reduction process 300 is, for example, processing that can be performed by block 210 of power manager process 200 illustrated in FIG. 2.

Power reduction process 300 can determine 302 one or more device functions that are not necessary for the impending device usage. The determined device functions can then be disabled 304 at least during the impending device usage. The disablement of the determined device functions can be disabled 304 automatically (without specific user request) or following a user request or confirmation to disable. Thereafter, the power requirements for the impending device usage can be re-estimated 306. At this point the power requirements for the impending device usage should have been lowered given that one or more of the determined device functions has been disabled 304. Decision 308 can then determine whether the available battery power is greater than the re-estimated power requirements. When decision 308 determines that the available battery power is greater than the re-estimated power requirements, the disablement 304 of the one or more determined device functions has been effective to reduce the power requirements for the impending device usage so that the available battery power is adequate to support the impending device usage. At this point, power reduction process 300 can end.

On the other hand, when decision 308 determines that the available battery power is still not adequate to satisfy the re-estimated power requirements, a warning can be presented 310 on a display device associated with the electronic device. For example, the warning can notify the user of the electronic device that the impending device usage cannot be properly supported unless an external power source is utilized or the battery is further charged.

Next, decision 312 can determine whether the user of the electronic device has initiated power adjustments. Here, the user of the electronic device can make power adjustments to further reduce (or otherwise alter) power consumption by the electronic device. Here, the behavior of the electronic device can be modified 314 based on user input. For example, the user input may request or authorize the electronic device to make further (or alternative) function or operational sacrifices in order to preserve the available battery power for the impending device usage. Following block 314, as well as following decision 312 when the user does not make any power adjustments, power reduction process 300 can end.

The power management provided by the power manager process or power reduction process 300 can operate in a wide range of scenarios depending on an electronic device and its capabilities. Two scenarios are discussed below but numerous other scenarios are available depending on the capabilities of the electronic device.

One exemplary usage scenario involves an electronic device (namely, a portable electronic device) that supports voice communication usage (i.e., phone usage) and media playback usage. A user of the electronic device may have an impending phone call to take using the electronic device in thirty (30) minutes. The electronic device can know or predict this by various means, including past usage data, a calendar entry, user input, etc. However, if the user is now playing back media content using the electronic device, the electronic device can manage its power utilization as needed. For example, when a battery powering the electronic device does not have sufficient stored energy to play the media content for thirty (30) minutes and then support the phone call for its likely duration, the power management can cease the media playback and/or alter the user that power conservation is required. Alternatively, the power management might permit the media playback to continue but without use of a display or with reduced volume.

Another exemplary usage scenario involves an electronic device (namely, a portable electronic device) that supports workout support and media playback usage. A user of the electronic device may be initiating a workout, such as a five (5) kilometers run, during which the electronic device can monitor performance data concerning the run. The electronic device can also permit the user to playback media content during the run. Just prior to starting the workout, the electronic device can evaluate whether its battery has sufficient stored energy to power both the workout support as well as the media playback for at least the likely duration of the run. Since the length of the run is known in this example, the duration for the run can be estimated. The electronic device can store information regarding the average run times for one or more distances or run speeds for various run distances. The energy/power required for the workout, including the workout support as well as media playback, can then be estimated. In the event that the battery lacks sufficient energy/power, the power management can cease media playback or workout support during the run, can disable a display, can limit media playback volume, etc. In one example, if the user prefers to run with media playback and without workout support if battery capacity is limited, then workout support can be disabled. In another example, if disabling the display (e.g., no use of backlight of LCD display) during the workout is adequate to bring the required energy/power within the battery's stored capacity, then the electronic device can disable the display but continue workout support as well as media playback. The disabling can be automatic or following user input. In one embodiment, the power management can alternatively or additionally notify the user of the electronic device through visual (e.g., via display) or audio means that power management is needed. The user can they make selection to influence or control power management. For example, the notification might indicate "You don't have enough charge in your battery to complete the run with music unless you disable music playback (alternatively disable display or disable phone), which would you like to disable?" The user can then make a selection with respect to a power adjustment screen on how they prefer the power management to be performed.

Figure 4:
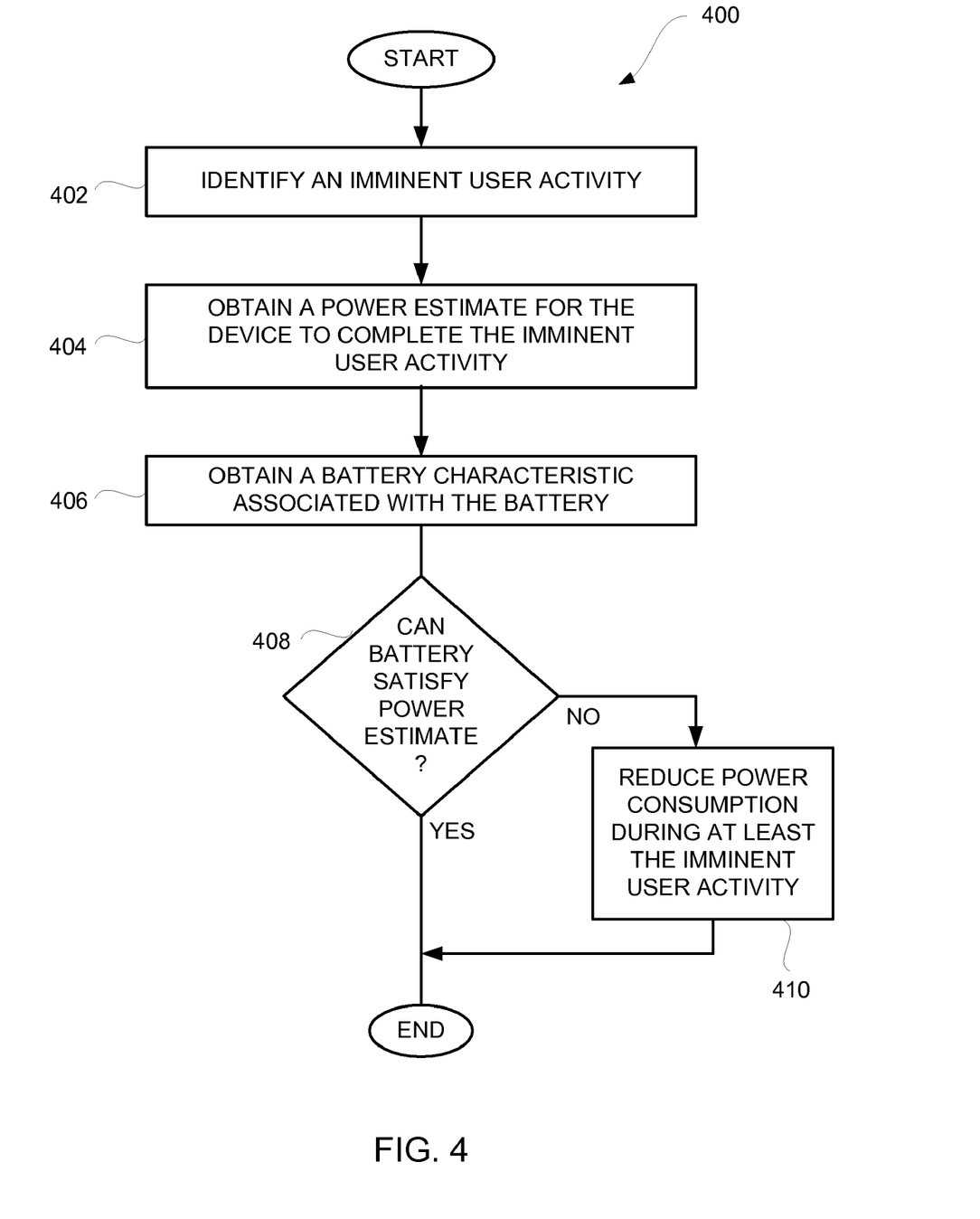
FIG. 4 is a flow diagram of a power manager process according to another embodiment of the invention.

FIG. 4 is a flow diagram of power manager process 400 according to one embodiment of the invention. Power manager process 400 is, for example, performed by an electronic device, such as device 100 illustrated in FIG. 1.

Power manager process 400 can identify 402 an imminent user activity. In one implementation, the imminent user activity can be associated with a recent user selection (e.g., via a GUI) of a user activity. Next, a power estimate for the electronic device to complete the imminent user activity can be obtained 404. The power estimate can be dependent on the type of user activity. Examples of types of user activity depend on the particular device but can, for example, include wireless voice communications, data transfer, media playback (e.g., song, album, audiobook, video, podcast, or playlist), workout support, etc. A battery characteristic associated with the battery can also be obtained 406. Thereafter, decision 408 can determine whether the battery can satisfy the power estimate associated with the imminent user activity. When decision 408 determines that the battery cannot satisfy the power estimate, power consumption for the electronic device can be reduced 410 during at least the imminent user activity. Following block 410, as well as following decision 408 when the battery can satisfy the power estimate, power manager process 400 ends.

Figure 5:
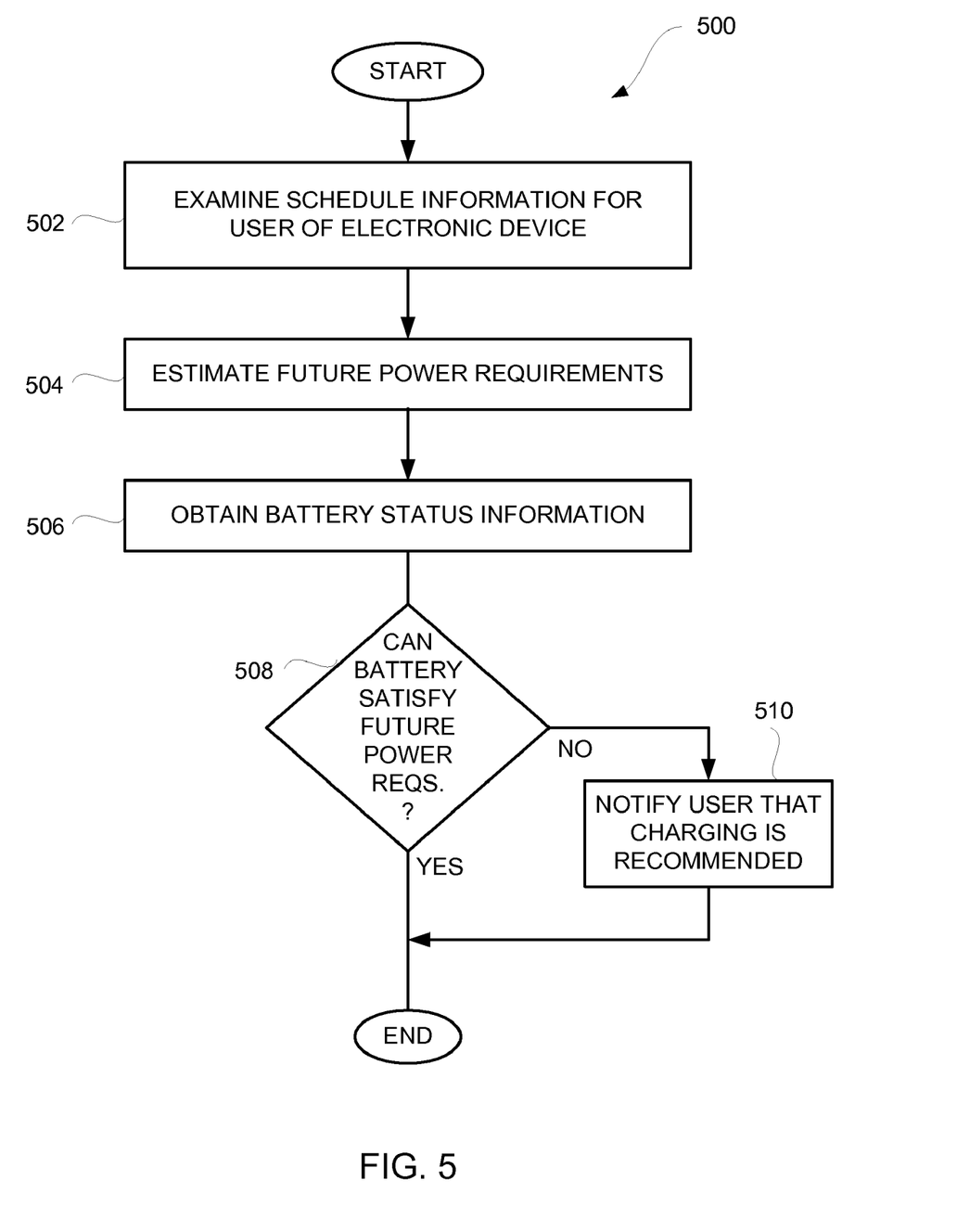
FIG. 5 is a flow diagram of a charge monitor process according to one embodiment of the invention.

FIG. 5 is a flow diagram of charge monitor process 500 according to one embodiment of the invention. Charge monitor process 500 is, for example, performed by an electronic device, such as device 100 illustrated in FIG. 1.

Charge monitor process 500 can examine 502 schedule information for a user of the electronic device. The schedule information can pertain to a calendar or schedule maintained by the electronic device or otherwise accessible to the electronic device. Next, future power requirements can be estimated 504. Here, in one embodiment, the future power requirements are the power requirements for the usage of the electronic device as indicated, at least in part, by the schedule information. Accordingly, the power requirements for the electronic device to support the activities or usage associated with the schedule information can be estimated 504. Estimation 504 of the power requirements can be performed in view of historical power usage, duration of usage or activities, or other characteristics of the electronic device, user or scheduled activity. Battery status information can also be obtained 506. The battery status information indicates the status of the battery, such as a battery charge level. Thereafter, decision 508 can determine whether the battery can satisfy the future power requirements. When decision 508 determines that the battery cannot satisfy the future power requirements, the user of the electronic device can be notified 510 that charging is recommended. Notification 510 to the user can further be provided to the user with sufficient advance notice so that sufficient amount of time for charging is provided. Still further, notification 510 can advise a user of the minimum, recommended or suggested duration of charging to be provided. Following block 510, as well as following decision 508 directly when the battery already is able to satisfy the future power requirements, charge monitor process 500 ends. However, charge monitor process 500 can be periodic or event driven so that it can be performed as appropriate to monitor the need for charging of the battery in view of usage, both current and future, of the electronic device.

Figure 6:
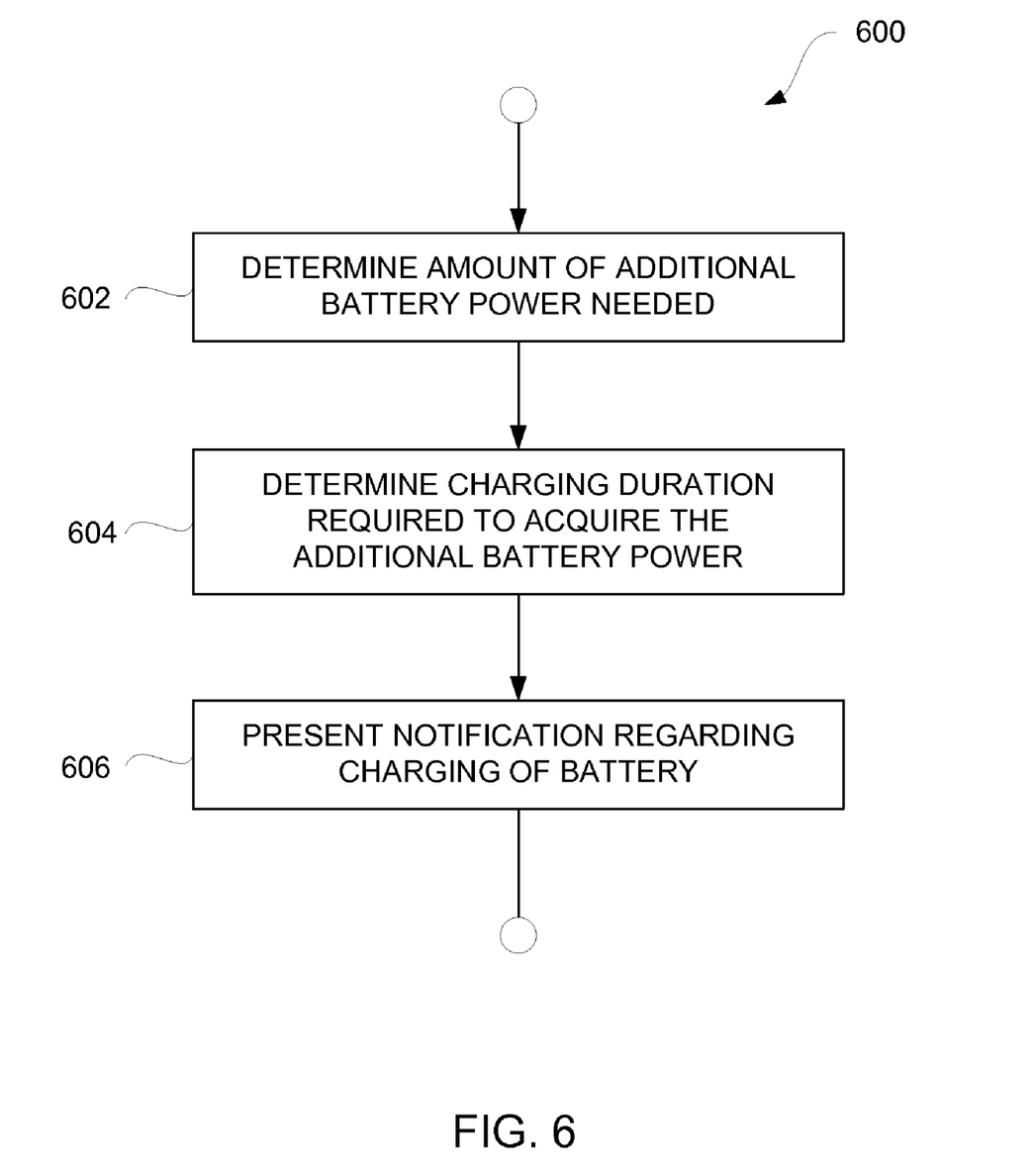
FIG. 6 is a flow diagram of a charge notification process according to one embodiment of the invention.

FIG. 6 is a flow diagram of charge notification process 600 according to one embodiment of the invention. Charge notification process 600 can, for example, represent processing associated with block 510 of charge monitor process 500. Charge notification process 600 can determine 602 an amount of additional battery power needed to support the future power requirements. A charging duration required to acquire the additional battery power can be determined 604. The charging duration is dependent on the amount of additional battery power needed. Determination 604 can also take into consideration characteristics of the battery, such as type of battery, charging characteristics, condition of battery, age of battery, etc., which can affect the charging duration. After the charging duration is determined 604, a notification regarding charging of the battery can be presented 606. Once the notification is presented 606, charge notification process 600 can end.

Optionally, the timing of presentation 606 of the notification can be controlled. For example, assume that in order for the battery to be able to satisfy the future power requirements additional charging of the battery is needed. If the battery is estimated to be able to satisfy the future power requirements after thirty minutes of charging (charging duration), the notification regarding charging can inform the user of such minimum charging time. The notification regarding charging can also be sent to a user in advance of the future power requirements such that the user has adequate time to sufficiently charge the battery. For example, if the future power requirements are that one (1) hour of video playback is needed on the electronic device for a 4:00 PM meeting, then the user can be notified at 3:00 PM that thirty (30) minutes of charging is needed prior to the 4:00 PM meeting.

A graphical user interface can be provided by an electronic device, namely, a portable electronic device that supports power consumption management. The graphical user interface can take various forms to assist users in providing one or more user settings that can be utilized by the electronic device to provide power consumption management.

Figure 7:
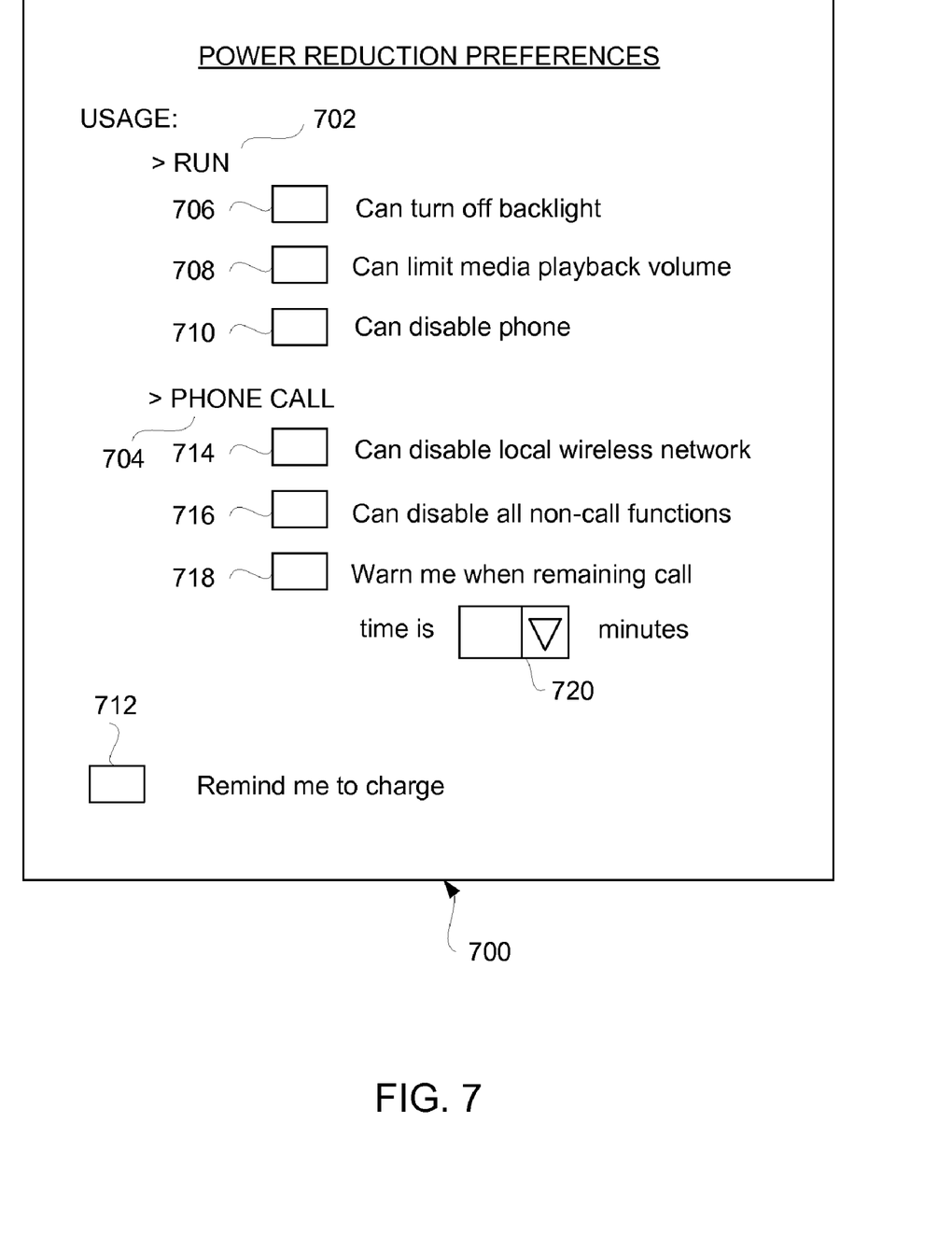
FIG. 7 is an exemplary graphical user interface that can present a display screen on a display of an electronic device according to one embodiment of the invention.

FIG. 7 is an exemplary graphical user interface that can presented display screen 700 on a display of an electronic device according to one embodiment of the invention. Display screen 700 enables a user to set power reduction preferences. Display screen 700 can be referred to as a power adjustment screen. Using display screen 700, a user can interact with the electronic device to set power reduction preferences with respect to different usage activities for the electronic device. For example, as illustrated in FIG. 7, the usage activities can include running 702 ("Run") and phone call 704 ("Phone Call").

With respect to run 702 usage, user selection control 706 can enable a user to authorize the electronic device to turn-off a back light associated with the display screen during a run. User selection control 708 can authorize the electronic device to limit media playback volume during a run. User selection control 710 can allow the electronic device to disable the phone during a run. User selection control 712 can request that the electronic device remind the user to charge the device if it is anticipated that the battery will need additional charge to satisfy likely future usage. Such charge reminders can be generally applicable across many potential usages as indicated in FIG. 7, or can be directed to particular usages (e.g., run, phone call, etc.).

With respect to phone call 704 usage, user selection control 714 can authorize the electronic device to disable access to a local wireless network. User selection control 716 can authorize the electronic device to disable all non-call functions. User selection control 718 can request that the electronic device warn the user when remaining call time is below a user-determined number of minutes. The user-determined number of minutes can be selected using input control 720.

According to another embodiment of the invention, a user can specify a reserve power reservoir that can be maintained or preserved so that an electronic device can reliably provide its most important functions. For example, a user may want to be notified when the music playback capability is below a minimum duration (e.g., 1 hour). In such an example, the notification can be presented in an audio or visual manner so that the user understands that the ability to playback media for the minimum duration will be jeopardized if they continue with an on-going usage (e.g., phone call).

In one embodiment, reserving power for a particular function or operation can impact power management as discussed above. For example, available battery power can be reduced by the reserved power amount before performing the various power management embodiments discussed above. In other words, the monitored battery power is reduced by the amount of reserved power to yield an effective available power that can be used with power management processing.

The electronic device as described herein can be a wireless communication device (e.g., portable telephone) capable of communication over a network. The wireless communication device can also include other applications such as a media playback application.

The electronic device as described herein can be a media device (e.g., media player) capable of playing (including displaying) media items. The media items can pertain to audio items (e.g., audio files or songs), videos (e.g., movies) or images (e.g., photos). The media device can also include other applications such as a wireless communication application.

In one embodiment, the electronic device is a portable electronic device. In one implementation, the portable electronic device is a handheld electronic device. Often, portable electronic devices are handheld electronic devices that can be easily held by and within a single hand of a user. The portable electronic device can also pertain to a wearable electronic device or a miniature electronic device. However, the invention can apply to electronic devices whether portable or not.

Figure 8:
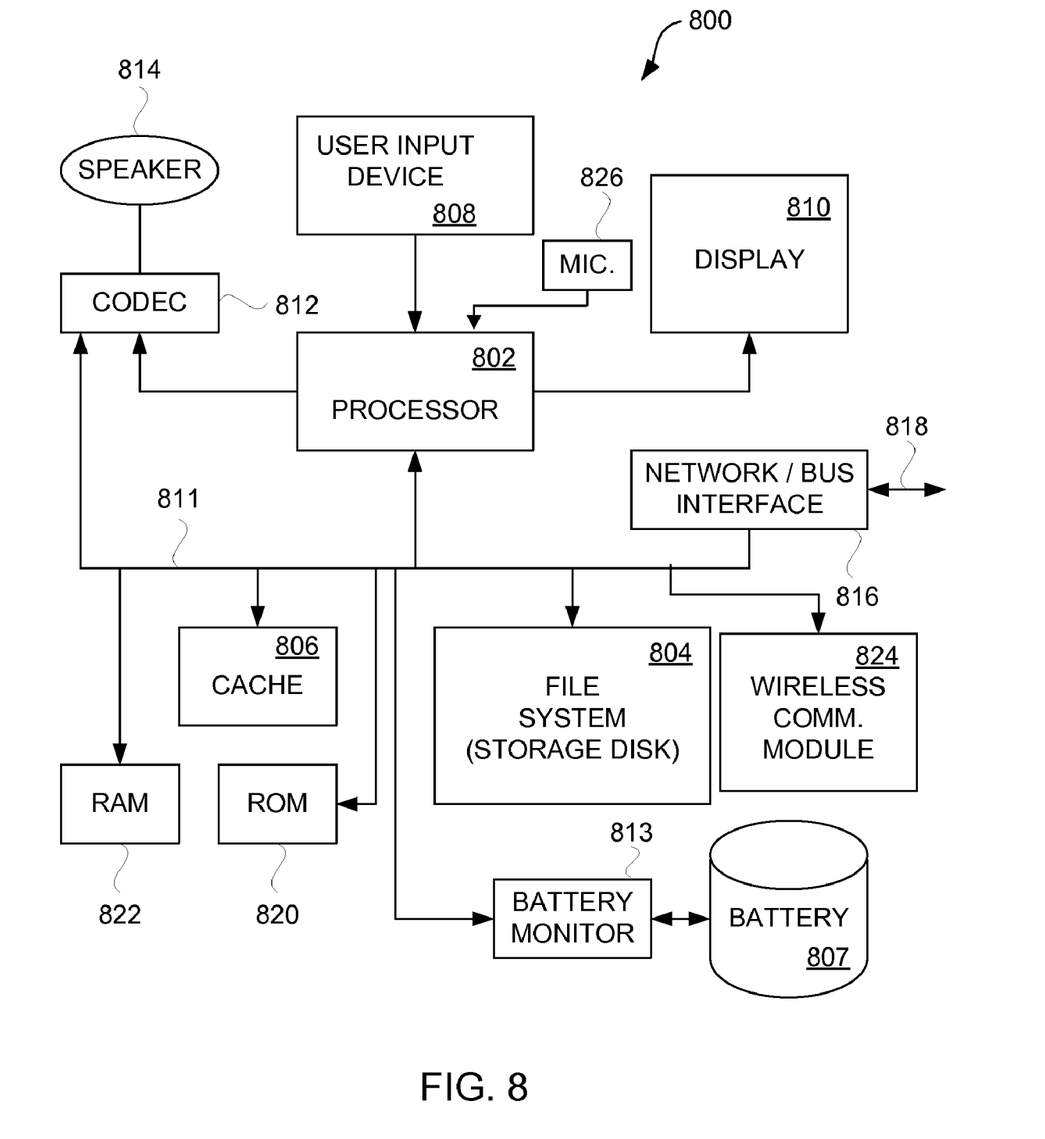
FIG. 8 is a block diagram of media player according to one embodiment of the invention.

FIG. 8 is a block diagram of media player 800 according to one embodiment of the invention. Media player 800 can include the circuitry of device 100 in FIG. 1, can perform the operations described with reference to FIGS. 2-6, and/or can present a display screen as in FIG. 7.

Media player 800 can include processor 802 that pertains to a microprocessor or controller for controlling the overall operation of media player 800. Media player 800 can store media data pertaining to media items in file system 804 and cache 806. File system 804 is, typically, a storage disk or a plurality of disks. File system 804 typically provides high capacity storage capability for media player 800. File system 804 can store not only media data but also non-media data. However, since the access time to file system 804 is relatively slow, media player 800 can also include cache 806. Cache 806 is, for example, Random-Access Memory (RAM) provided by semiconductor memory. The relative access time to cache 806 can be substantially shorter than for file system 804. However, cache 806 does not have the large storage capacity of file system 804. Further, file system 804, when active, consumes more power than does cache 806. The power consumption is often a concern when media player 800 is a portable media player that is powered by battery 807. Media player 800 can also includes RAM 820 and Read-Only Memory (ROM) 822. ROM 822 can store programs, utilities or processes to be executed in a non-volatile manner. RAM 820 provides volatile data storage, such as for cache 806.

Media player 800 can also include user input device 808 that allows a user of media player 800 to interact with media player 800. For example, user input device 808 can take a variety of forms, such as a button, keypad, dial, etc. (physical or soft implementations) each of which can be programmed to individually or in combination perform any of a suite of functions. In one implementation, user input device 808 can be provided by a dial that physically rotates. In another implementation, user input device 808 can be implemented as a touchpad (i.e., a touch-sensitive surface). In still another implementation, user input device 808 can be implemented as a combination of one or more physical buttons as well as a touchpad. Still further, media player 800 can include display 810 (screen display) that can be controlled by processor 802 to display information to the user. Data bus 811 can facilitate data transfer between at least file system 804, cache 806, processor 802, and CODEC 812.

Media player 800 can also provide status monitoring of battery 807. In this regard, media player 800 can include battery monitor 813. Battery monitor 813 can be operatively coupled to battery 807 to monitor conditions. Battery monitor 813 can, for example, communicate battery status (or conditions) with processor 802.

In one embodiment, media player 800 can serve to store a plurality of media items (e.g., songs) in file system 804. When a user desires to have media player 800 play a particular media item, a list of available media items can be displayed on display 810. Then, using user input device 808 (or voice commands), a user can select one of the available media items. Processor 802, upon receiving a selection of a particular media item, can supply the media data (e.g., audio file) for the particular media item to coder/decoder (CODEC) 812. CODEC 812 can then produce analog output signals for speaker 814. Speaker 814 can be a speaker internal to media player 800 or external to media player 800. For example, headphones or earphones that connect to media player 800 could be considered an external speaker. Speaker 814 can not only be used to output audio sounds pertaining to the media item being played, but also to output audio notifications pertaining to battery status. Notifications of battery status can also be output to display 810.

In one embodiment, media player 800 is a portable computing device that can support processing media, such as audio. For example, media player 800 can be a music player (e.g., MP3 player), a game player, and the like. These devices are generally battery operated and highly portable so as to allow a user to listen to music, play games or video, record video or take pictures wherever the user travels.

In one implementation, media player 800 is a handheld device sized for placement into a pocket or hand of the user. By being handheld, media player 800 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, in one implementation, the device may be operated by the user's hands; no reference surface such as a desktop is needed.

Media player 800 can also include network/bus interface 816 that couples to data link 818. Data link 818 can allow media player 800 to couple to a host computer. Data link 818 can be provided over a wired connection or a wireless connection. In the case of a wireless connection, network/bus interface 816 can include a wireless transceiver.

To support wireless communications, media player 800 can also include wireless communications module 824. Wireless communication module 824 can be considered to provide voice communications (e.g., calls via a cellular network), whereas network/bus interface 816 can be considered to provide data communications. A user of media player 800 can thus make and receive voice calls using the wireless communications module in media player 800. Wireless communications module 824 can also couple to data bus 811 to couple to processor 802 and other resources. Media player 800 can also include microphone 826 for pickup of the user's voice.

The invention is suitable for use with battery-powered electronic devices. However, the invention is particularly well suited for handheld electronic devices, such as a handheld media device. One example of a handheld media device is a portable media player (e.g., music player or MP3 player). Another example of a handheld media device is a mobile telephone (e.g., cell phone) or Personal Digital Assistant (PDA).

Portable media devices can store and play audio sounds pertaining to media assets (media items), such as music, audiobooks, meeting recordings, and other speech or voice recordings. Portable media devices, such as media players, are small and highly portable and have limited processing resources. Often, portable media devices are handheld media devices which can be easily held by and within a single hand of a user.

One example of a media player is the ipod® media player, which is available from Apple Inc. of Cupertino, Calif. Often, a media player acquires its media assets from a host computer that serves to enable a user to manage media assets. As an example, the host computer can execute a media management application to utilize and manage media assets. One example of a media management application is iTunes®, produced by Apple Inc.

U.S. patent application Ser. No. 11/209,367, filed Aug. 22, 2005, and entitled "AUDIO STATUS INFORMATION FOR A PORTABLE ELECTRONIC DEVICE," is hereby incorporated herein by reference.

U.S. patent application Ser. No. 11/565,890, filed Dec. 1, 2006, and entitled "POWER CONSUMPTION MANAGEMENT FOR FUNCTIONAL PRESERVATION IN A BATTERY-POWERED ELECTRONIC DEVICE," is hereby incorporated herein by reference.

U.S. patent application Ser. No. 11/439,613, filed May 23, 2006, and entitled "PORTABLE MEDIA DEVICE WITH POWER MANAGED DISPLAY," is hereby incorporated herein by reference.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that an electronic device can operate to manage power utilization by the electronic device in view of impending usage and battery condition. Another advantage of the invention is that an electronic device can operate to manage its power usage to preserve one of its functions over another when available battery power is diminished. Another advantage of the invention is that a user of an electronic device can participate in power management behavior of the electronic device when available battery power is diminished. Still another advantage of the invention is that an electronic device can provide a notification that charging of a battery is recommended in view of impending usage of the electronic device.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for managing power utilization by an electronic device powered by a battery, the method comprising:
   receiving a user selection indicating an imminent usage for the electronic device;
   estimating a future power requirement for the electronic device based on the imminent usage;
   obtaining a battery characteristic associated with the battery;
   determining, based on the battery characteristic, whether the battery has adequate capacity to satisfy the estimated future power requirement for the electronic device; and
   reducing power consumption of the electronic device when the determining determines that the battery has inadequate capacity to satisfy the future power requirement; and
   presenting a notification regarding charging the battery when the determining determines that the battery has inadequate capacity to satisfy the future power requirement, the notification including a recommended charging duration, the recommended charging duration being based on the estimated future power requirement.

2. A method as recited in claim 1, wherein the estimating of the future power requirement is further based on a schedule associated with a user of the electronic device.

3. A method as recited in claim 1, wherein the estimating of the future power requirement is further based on a predicted usage of the electronic device.

4. A method as recited in claim 1, wherein the estimating of the future power requirement is further based on a current usage of the electronic device.

5. A method as recited in claim 1, wherein the future power requirements is a power estimate for the electronic device to complete a predicted, imminent, future, scheduled and/or current usage of the electronic device.

6. A method as recited in claim 1, wherein the estimating of the future power requirements is based on continuation of the imminent usage for a predetermined duration.

7. A method for managing power utilization by an electronic device powered by a battery, the method comprising:
identifying an impending device usage;
obtaining a power estimate for the electronic device to complete the impending device usage;
obtaining a battery characteristic associated with the battery;
determining, based on the battery characteristic, whether the battery has adequate capacity to satisfy the power estimate for the electronic device to complete the impending device usage; and
reducing power consumption of the electronic device during at least the impending device usage when the determining determines that the battery has inadequate charge capacity to satisfy the power estimate for the electronic device to complete the impending device usage,
wherein the impending device usage includes a workout usage, and the workout usage has an associated duration, and
wherein the power estimate pertains to an estimate of power needed to power the electronic device to provide at least workout data capture and media playback for the duration of the workout usage.

8. A method as recited in claim 7, wherein the identifying of the impending device usage is based at least in part on a user input.

9. A method as recited in claim 8, wherein the user input initiates the impending device usage.

10. A method as recited in claim 7, wherein the identifying estimates or predicts the impending device usage.

11. A method as recited in claim 7, wherein the identifying comprises receiving an indication of the impending device usage based on a user input.

12. A method as recited in claim 7, wherein the electronic device is a multi-functional device.

13. A method as recited in claim 12, wherein the reducing of the power consumption of the electronic device comprises:
automatically disabling one or more functions that are not necessary to support the impending device usage.

14. A method as recited in claim 12, wherein the reducing of the power consumption of the electronic device comprises:
disabling one or more functions that are not necessary to support the impending device usage but which reduce power consumption so that the battery has adequate capacity to satisfy the reduced power needs for the electronic device to complete the impending device usage.

15. The method as recited in claim 14, wherein one or more functions are operable on the portable electronic device, and wherein at least a plurality of the one or more functions are software applications, each of the software applications provide the portable electronic device with different capabilities when such software application is operating.

16. A method as recited in claim 12, wherein the multi-functional device has a display, and
wherein the reducing of the power consumption of the electronic device comprises:
presenting a power adjustment screen on the display, the power adjustment screen providing at least one user-selectable power saving option; and
reducing the power consumption of the electronic device in accordance with the user-selectable power saving option when the user-selectable option is selected.

17. A method as recited in claim 16, wherein the method further comprises:
presenting a warning that the battery has inadequate capacity to satisfy the power estimate for the electronic device to complete the impending device usage.

18. A method as recited in claim 17, wherein the presenting the warning comprises displaying the warning on the display, wherein the warning is provided within the power adjustment screen.

19. A method as recited in claim 12, wherein the multi-function device supports a plurality of functions selected from the group of: media playback, voice communications, data transfer, or workout data capture.

20. A method as recited in claim 7, wherein the method further comprises:
presenting a warning that the battery has inadequate capacity to satisfy the power estimate for the electronic device to complete the impending device usage.

21. A method as recited in claim 7, wherein the method further comprises:
presenting a notification regarding charging the battery when the determining determines that the battery has inadequate capacity to satisfy the power estimate for the electronic device to complete the impending device usage, the notification including a recommended charging duration.

22. A method as recited in claim 7, wherein an estimated duration is associated with the workout usage, and wherein the power estimate is based in part on the estimated duration of the workout usage.

23. A method as recited in claim 7,
wherein the battery characteristic is used to determine a power estimate for the electronic device to complete the impending device usage,
wherein the obtaining of the battery characteristic obtains an available battery power of the battery, and
wherein the determining of whether the battery has adequate capacity comprises comparing the power estimate to the available battery power.

24. A method for managing power utilization by an electronic device powered by a battery, the method comprising:
estimating a future power requirement for the electronic device;
obtaining a battery characteristic associated with the battery;
determining, based on the battery characteristic, whether the battery has adequate capacity to satisfy the estimated future power requirement for the electronic device;
determining a recommended charging duration for the battery to acquire adequate capacity to satisfy the future power requirement; and
presenting a notification regarding charging the battery when the determining determines that the battery has inadequate capacity to satisfy the future power requirement, the notification including the recommended charging duration.

25. A computer readable medium including at least computer program code for managing power utilization by an electronic device powered by a battery, the computer readable medium comprising:
   computer program code for receiving a user selection indicating an impending device usage for the electronic device;
   computer program code for estimating a future power requirement for the electronic device based on the impending device usage;
   computer program code for determining whether the battery has adequate capacity to satisfy the estimated future power requirement for the electronic device;
   computer program code for reducing power consumption of the electronic device when the computer program code for determining determines that the battery has inadequate capacity to satisfy the future power requirement;
   computer program code for presenting a notification regarding charging the battery when the computer program code for determining determines that the battery has inadequate capacity to satisfy the future power requirement; and
   computer program code for determining a recommended charging duration for the battery to acquire adequate capacity to satisfy the future power requirement, the recommended charging duration being based on the future power requirement,
   wherein the notification includes the recommended charging duration.

26. A computer readable medium as recited in claim 25,
   wherein the computer program code for determining whether the battery has adequate capacity comprises:
      computer program code for obtaining a battery characteristic associated with the battery, and
   wherein the computer readable medium for determining whether the battery has adequate capacity is based on the battery characteristic.

27. A portable electronic device, comprising:
   a display;
   a battery;
   a battery monitor configured to acquire battery status information from the battery;
   a user input device configured to receive a user selection indicating imminent usage for said portable electronic device;
   a device usage manager configured to provide device usage information, the device usage information being based on the imminent usage for said portable electronic device as indicated by the user selection; and
   a power manager operatively connected to the battery monitor and the device usage manager, the power manager manages power utilization by the electronic device based on the device usage information and the battery status information, and the power manager further causes a notification to be displayed on the display, the notification pertaining to at least inadequate capacity of the battery and providing a recommended charging duration the recommended charging duration being based on the device usage information.

28. A portable electronic device as recited in claim 27, wherein the power manager operates to: estimate a future power requirement for the electronic device; obtain a battery characteristic associated with the battery; determine, based on the battery characteristic, whether the battery has adequate capacity to satisfy the estimated future power requirement for the electronic device; and reduce power consumption of the electronic device when the battery has inadequate capacity to satisfy the future power requirement.

29. A portable electronic device as recited in claim 28, wherein the future power requirement is a power estimate for the electronic device to complete a predicted, imminent, scheduled and/or current usage of the electronic device.

30. A portable electronic device as recited in claim 28, wherein the notification comprises a warning that the battery has inadequate capacity to satisfy the estimated future power requirement.

31. A portable electronic device as recited in claim 27, wherein the portable electronic device supports a plurality of functions selected from the group of: media playback, voice communications, data transfer, or workout data capture.

32. A method as recited in claim 24, wherein the electronic device is a portable, multi-functional device.

33. A method as recited in claim 32, wherein the multi-function device supports a plurality of functions selected from the group of: media playback, voice communications, data transfer, or workout data capture.

34. A method as recited in claim 32, wherein the multi-function device supports at least a media playback function and workout data capture function.

* * * * *